United States Patent
Otake et al.

(10) Patent No.: US 7,751,082 B2
(45) Date of Patent: Jul. 6, 2010

(54) IMAGE PROCESSING APPARATUS AND IMAGE PROCESSING METHOD FOR GENERATING ATTRIBUTE INFORMATION OF AN IMAGE BASED ON IMAGE SEPARATING PROCESSING

(75) Inventors: Ritsuko Otake, Kawasaki (JP); Shinichi Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1044 days.

(21) Appl. No.: 11/426,676

(22) Filed: Jun. 27, 2006

(65) Prior Publication Data

US 2007/0002065 A1 Jan. 4, 2007

(30) Foreign Application Priority Data

Jun. 30, 2005 (JP) .............................. 2005-191540

(51) Int. Cl.
*H04N 1/60* (2006.01)
*H04N 1/40* (2006.01)
*G06K 9/34* (2006.01)

(52) U.S. Cl. ..................... 358/1.9; 358/2.1; 358/462; 382/173; 382/176

(58) Field of Classification Search ................. 358/1.9, 358/2.1, 462; 382/173, 176
See application file for complete search history.

(56) References Cited

U.S. PATENT DOCUMENTS 6,977,754 B2 * 12/2005 Matsumoto et al. .......... 358/1.9
7,456,982 B2 * 11/2008 Curry et al. ................ 358/1.13
7,499,195 B2 * 3/2009 Ono ............................ 358/1.9
2002/0003633 A1 1/2002 Matsumoto et al.

FOREIGN PATENT DOCUMENTS

| JP | 2000-134468 A | 5/2000 |
|---|---|---|
| JP | 2001-358929 A | 12/2001 |
| JP | 2003-051943 A | 2/2003 |

* cited by examiner

*Primary Examiner*—Twyler L Haskins
*Assistant Examiner*—Fred Guillermety
(74) *Attorney, Agent, or Firm*—Canon U.S.A., Inc. I.P. Division

(57) ABSTRACT

An image processing apparatus includes a first generating unit configured to generate first attribute information of an image and pixels of the image based on rendering commands, a second generating unit configured to perform image area separation processing on an image generated by the first generating unit and to generate second attribute information of the pixels of the image, and an attribute information generating unit configured to generate third attribute information of the pixels of the image based on the generated first attribute information and the second attribute information. In this image processing apparatus, the attribute information generating unit is configured to generate the third attribute information of pixels contained in an object of the image represented by the first attribute information which is identical for each pixel in the object based on a combination of the first attribute information and the second attribute information.

15 Claims, 15 Drawing Sheets

| PDL ATTRIBUTE | IMAGE AREA SEPARATION RESULT | CHARACTER | CHARACTER INTERIOR | PICTURE |
|---|---|---|---|---|
| TEXT | | A | A | B |
| LINE | | A | B | B |
| GRAPHICS | | A | B | C |
| IMAGE | | B | C | C |

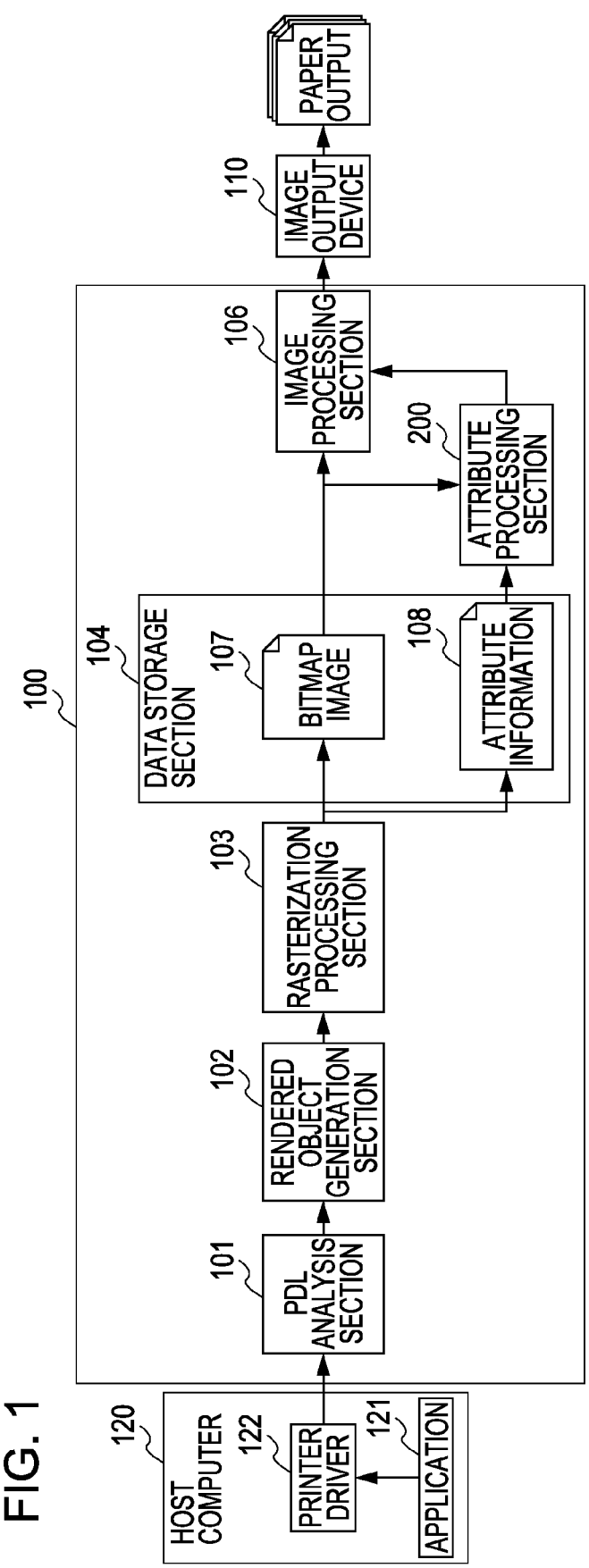
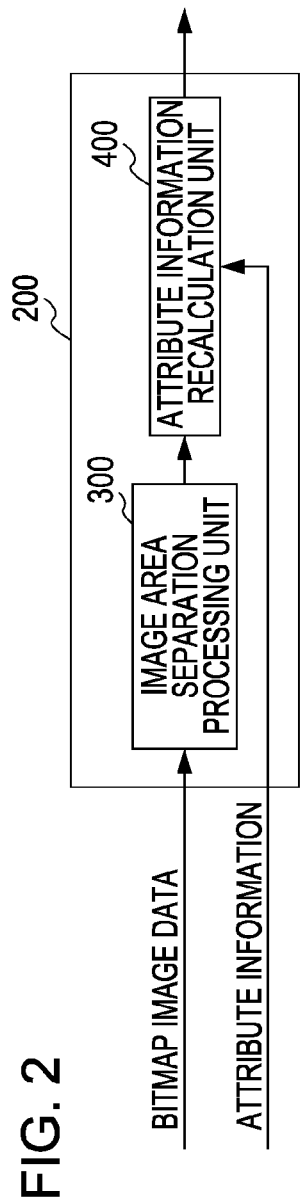
FIG. 1
FIG. 2

FIG. 6A

| × | × | × |
|---|---|---|
| H | × | L |
| × | × | × |

SET BIT 0 OF DIRAMI AT HIGH

FIG. 6B

| × | × | × |
|---|---|---|
| L | × | H |
| × | × | × |

SET BIT 1 OF DIRAMI AT HIGH

FIG. 6C

| × | H | × |
|---|---|---|
| × | × | × |
| × | L | × |

SET BIT 2 OF DIRAMI AT HIGH

FIG. 6D

| × | L | × |
|---|---|---|
| × | × | × |
| × | H | × |

SET BIT 3 OF DIRAMI AT HIGH

L: LOW LEVEL SIGNAL
H: HIGH LEVEL SIGNAL
×: DON'T CARE

FIG. 7

| A11 | A21 | A31 | A41 | A51 |
|-----|-----|-----|-----|-----|
| A12 | A22 | A32 | A42 | A52 |
| A13 | A23 | A33 | A43 | A53 |
| A14 | A24 | A34 | A44 | A54 |
| A15 | A25 | A35 | A45 | A55 |

DIRAMI VALUES OF TARGET PIXEL AND SURROUNDING PIXELS

| (0) | (1) | (2) | (3) | (4) | (5) | (6) | PICT_FH / ZONE_P |
|---|---|---|---|---|---|---|---|
| H | H | H | H | H | H | H | 7 |
| H | H | H | H | H | H | L | 6 |
| H | H | H | H | H | L | L | 5 |
| H | H | H | H | L | L | L | 4 |
| H | H | H | L | L | L | L | 3 |
| H | H | L | L | L | L | L | 2 |
| H | L | L | L | L | L | L | 1 |
| L | L | L | L | L | L | L | 0 |

FIG. 13

| EDGE | ZONE | MAP |
|------|------|-----|
| YES | THIN | CHARACTER |
| YES | THICK | CHARACTER INTERIOR |
| NO | THIN | PICTURE |
| NO | THICK | PICTURE |

FIG. 14

PDL ATTRIBUTE INFORMATION

| T | T | T | T | T |
|---|---|---|---|---|
| T | T | T | T | T |
| T | T | T | T | T |
| T | T | T | T | T |

T: TEXT

IMAGE AREA SEPARATION RESULT

| P | I | P | C | C |
|---|---|---|---|---|
| C | C | C | I | C |
| C | P | P | C | C |
| I | P | P | P | P |

C: CHARACTER
I: CHARACTER INTERIOR
P: PICTURE

FIG. 15

| COUNTER | PDL ATTRIBUTE | IMAGE AREA SEPARATION RESULT |
|---|---|---|
| cnt00 | TEXT | CHARACTER |
| cnt01 | | CHARACTER INTERIOR |
| cnt02 | | PICTURE |
| cnt10 | LINE | CHARACTER |
| cnt11 | | CHARACTER INTERIOR |
| cnt12 | | PICTURE |
| cnt20 | GRAPHICS | CHARACTER |
| cnt21 | | CHARACTER INTERIOR |
| cnt22 | | PICTURE |
| cnt30 | IMAGE | CHARACTER |
| cnt31 | | CHARACTER INTERIOR |
| cnt32 | | PICTURE |

FIG. 16

| PDL ATTRIBUTE \ IMAGE AREA SEPARATION RESULT | CHARACTER | CHARACTER INTERIOR | PICTURE |
|---|---|---|---|
| TEXT | A | A | B |
| LINE | A | B | B |
| GRAPHICS | A | B | C |
| IMAGE | B | C | C |

FIG. 17A

| PDL ATTRIBUTE \ IMAGE AREA SEPARATION RESULT | CHARACTER | CHARACTER INTERIOR | PICTURE |
|---|---|---|---|
| TEXT | A | A | B |
| LINE | A | B | B |
| GRAPHICS | A | B | C |
| IMAGE | B | C | C |

FIG. 17B

| PDL ATTRIBUTE \ IMAGE AREA SEPARATION RESULT | CHARACTER | CHARACTER INTERIOR | PICTURE |
|---|---|---|---|
| TEXT | A | A | B |
| LINE | A | A | B |
| GRAPHICS | A | A | C |
| IMAGE | B | B | C |

FIG. 17C

| PDL ATTRIBUTE \ IMAGE AREA SEPARATION RESULT | CHARACTER | CHARACTER INTERIOR | PICTURE |
|---|---|---|---|
| TEXT | A | A | A |
| LINE | A | A | B |
| GRAPHICS | B | B | C |
| IMAGE | C | C | C |

| PDL | TABLE TO BE USED |
|---|---|
| APPLICATION A | 17B |
| APPLICATION B | 17B |
| APPLICATION C | 17C |
| DEFAULT | 17A |

FIG. 20A

| PDL ATTRIBUTE \ IMAGE AREA SEPARATION RESULT | CHARACTER | CHARACTER INTERIOR | PICTURE |
|---|---|---|---|
| TEXT | A | A | A |
| LINE | A | A | A |
| GRAPHICS | B | B | B |
| IMAGE | C | C | C |

FIG. 20B

| PDL ATTRIBUTE \ IMAGE AREA SEPARATION RESULT | CHARACTER | CHARACTER INTERIOR | PICTURE |
|---|---|---|---|
| TEXT | A | A | A |
| LINE | A | A | B |
| GRAPHICS | B | B | C |
| IMAGE | C | C | C |

FIG. 20C

| PDL ATTRIBUTE \ IMAGE AREA SEPARATION RESULT | CHARACTER | CHARACTER INTERIOR | PICTURE |
|---|---|---|---|
| TEXT | A | A | A |
| LINE | A | A | B |
| GRAPHICS | B | B | C |
| IMAGE | B | C | C |

FIG. 20D

| PDL ATTRIBUTE \ IMAGE AREA SEPARATION RESULT | CHARACTER | CHARACTER INTERIOR | PICTURE |
|---|---|---|---|
| TEXT | A | A | B |
| LINE | A | A | B |
| GRAPHICS | A | B | C |
| IMAGE | B | B | C |

FIG. 20E

| PDL ATTRIBUTE \ IMAGE AREA SEPARATION RESULT | CHARACTER | CHARACTER INTERIOR | PICTURE |
|---|---|---|---|
| TEXT | A | B | C |
| LINE | A | B | C |
| GRAPHICS | A | B | C |
| IMAGE | A | B | C |

IMAGE PROCESSING APPARATUS AND IMAGE PROCESSING METHOD FOR GENERATING ATTRIBUTE INFORMATION OF AN IMAGE BASED ON IMAGE SEPARATING PROCESSING

BACKGROUND OF THE INVENTION

1. Field of the Invention

The present invention relates to an image processing apparatus and an image processing method.

2. Description of the Related Art

Recent years have seen development of color printers, digital color multifunction apparatuses, or the likes which form images using page description language (PDL) files generated and sent by, for example, host computers.

These image processing apparatuses interpret received PDL files so as to generate raster image data and attribute information which represents the attribute of the image. Image attributes are classified in units of pixels into, for example, a character/line drawing area, a figure area, and a natural image area. A number of techniques are introduced which utilize attribute information to effect image processing for obtaining output images using image processing apparatuses. For example, in one of these techniques, pieces of object information which represent image elements are generated. Then, the image processing is performed which is appropriate for the characteristics of the image elements.

On the other hand, another type of image processing apparatus such as a copying machine generates digital image data from a read original image and performs image processing necessary for printing out. In this type of image processing apparatus, image attributes of the digital image data are determined in units of pixels or units of blocks in the data. Then, appropriate image processing is performed in accordance with the result of the determining operation so that a high quality printed output is obtained. For example, a technique is applied to this type of image processing apparatus, in which image data generated from a read original image is analyzed, and at least two areas, e.g. a character area and a grayscale image area, are discriminated from each other. Then, a first and a second image processing operations are selectively performed on the individual areas. These first and second image processing operations include a technique which selectively smoothes or sharpens the character area or the grayscale image area into an intended level. The first and second image processing operations also include color conversion processing such as color collection and under color removal, and image editing processing such as mosaic image generation and mirror image generation. In addition, these image processing operations can be configured such that parameters necessary for the operations are manually set.

Moreover, techniques have been put into practice which apply the above described technique for determining image attributes (image area separation processing) so as to process PDL files, which brings about further increased output quality. For example, a technique is introduced in which image area separation processing is performed on each pixel in a raster image generated by interpreting a PDL file. Then, the result of the image area separation processing and attribute information generated by interpreting the PDL file are referred to in units of pixels, so that processing schemes suitable to each of the pixels are determined. Furthermore, there is another known technique for limiting signals used in an image separation processing operation so as to prevent image deterioration from occurring due to determination errors in the image area separation processing.

The above mentioned attribute information generated from a PDL file provides accurate segmentation of objects such as a character/line drawing object, a figure object, a natural image object, etc. However, such attribute information is sensitive to an application used in generating PDL files, and thus can inconsistently vary depending on the type and version of the application.

On the other hand, image area separation processing permits determination of attribute information which is consistent in an image processing system and also permits image classification most suitable to the system. However, image area separation processing involves a possibility of determination error due to its pixel by pixel processing. This error can cause a pixel processed for a character object to appear in a part of a natural image, for example, which results in image degradation.

A technique which utilizes attribute information generated from both a PDL file and a result of image area separation processing also involves a risk of failure in image reproduction: in a case where a determination error occurs in image area separation processing, the technique can fail to apply an identical image processing scheme for an identical object, resulting in appearance of intermittent staircasing and unnatural object boundaries in an output image.

SUMMARY OF THE INVENTION

The present invention has been made in view of the above circumstances. Accordingly, there is a need for an image processing apparatus and method which bring about increased image quality by effectively utilizing attribute information generated from a PDL file and attribute information generated from a result of image area separation processing performed on raster image data.

According to an aspect of the present invention, an image processing apparatus includes: a first generating unit configured to generate first attribute information of an image and pixels of the image based on rendering commands; a second generating unit configured to perform image area separation processing on an image generated by the first generating unit and generating second attribute information of the pixels of the image; and an attribute information generating unit configured to generate third attribute information of the pixels of the image based on the generated first attribute information and the generated second attribute information. In this image processing apparatus, the attribute information generating unit is configured to generate the third attribute information of pixels contained in an object of the image represented by the first attribute information which is identical for each pixel in the object based on a combination of the first attribute information and the second attribute information.

Further features and characteristics of the present invention will become apparent from the following description of exemplary embodiments with reference to the attached drawings.

BRIEF DESCRIPTION OF THE DRAWINGS

FIG. 1 illustrates a configuration of an image processing system for implementing an exemplary embodiment.

FIG. 2 illustrates a configuration of an attribute processing section according to an exemplary embodiment.

FIGS. 6A to 6D illustrate edge direction detection rules in an edge direction detection portion according to an exemplary embodiment.

FIG. 7 illustrates a matrix used for detecting opposing edges.

FIG. 13 illustrates an output rule of an image area separation result signal MAP.

FIG. 14 shows an example of PDL attribute information and an image area separation result.

FIG. 15 illustrates counters.

FIG. 16 illustrates an example of final attribute information allocation rule.

FIGS. 17A to 17C illustrate examples of final attribute information allocation rules for a second exemplary embodiment.

FIGS. 20A to 20E illustrate examples of final attribute information allocation rules desirable for the third exemplary embodiment.

DESCRIPTION OF THE EMBODIMENTS

Image processing according to exemplary embodiments of the present invention will now be described in detail with reference to the accompanying drawings.

In the following, a case will be described where the present invention is applied to a multifunction printer (MFP) provided with an electophotographic color printer with PDL file output capability. However, the present invention is not limited to this case, and can be applied to other types of image processing apparatuses, such as laser beam printers and inkjet printers, within a scope that does not deviate from the gist of the present invention.

First Embodiment

Figure 22:
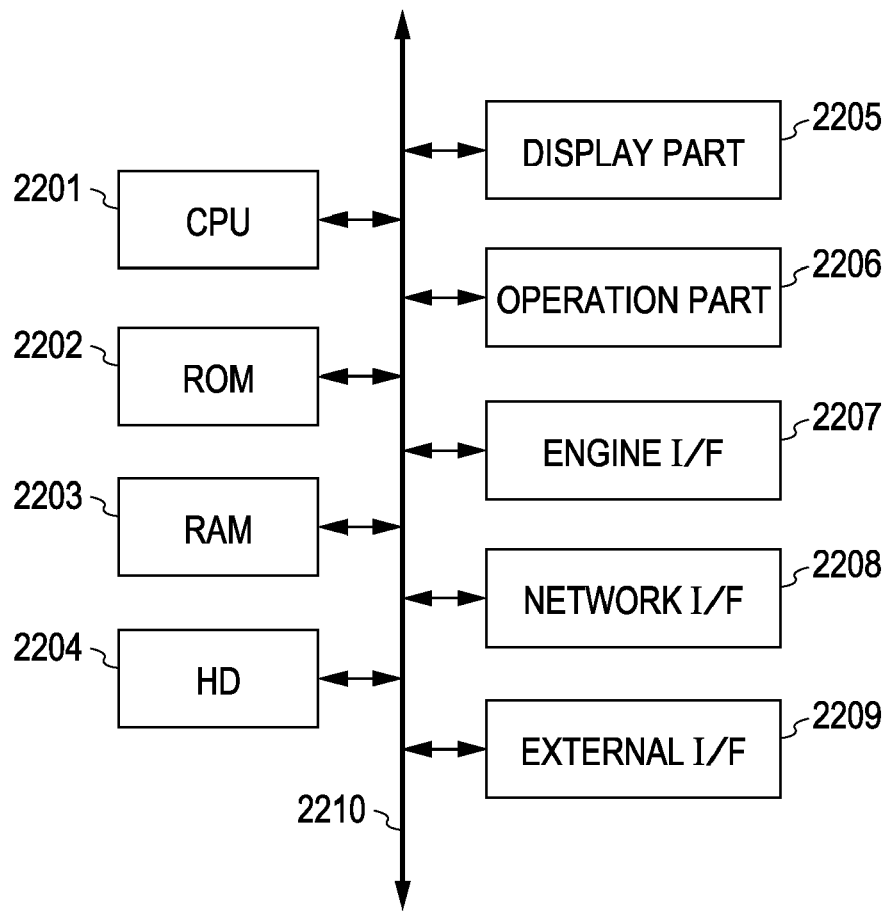
FIG. 22 is a block diagram illustrating a configuration of a multifunction printer.

FIG. 22 is a block diagram illustrating a configuration of a multifunction printer (MFP). In this MFP, a central processing unit (CPU) 2201, using a random access memory (RAM) 2203 as a work memory, controls the MFP via a system bus 2210 and performs various processing on the basis of a program or data stored in a read-only memory (ROM) 2202. The processing performed by CPU 2201 will be described below.

The ROM 2202 stores a system activation program, a program for controlling a printer engine, character data information, character code information, etc. The RAM 2203 stores font data added through downloading and is loaded with programs or data corresponding to various processing operations. The RAM 2203 also serves as a data storage area for image data received from external sources. The MFP also includes a storage part (HD) 2204 which can be a hard disk used for storing spooled data, a program file, an information file, image data, attribute information or the like. The HD 2204 also serves as a work area of the CPU 2201.

The MFP also has a display part 2205 and an operation part 2206. The display part 2205, which is composed of, for example, a liquid crystal panel or the like, displays descriptions of a setting state of the MFP, an operation being activated in the MFP, an error state, and so forth. The operation part 2206, composed of a key, a button, a touch panel, or the like, is used for operations performed by a user, such as a setting of the MFP, a setting change, and resetting. As described below, the display part 2205 and the operation part 2206 allow display of an operation screen for a selection of an output processing mode.

Interfaces (I/Fs) are included in the MFP such as an engine I/F 2207, a network I/F 2208, and an external I/F 2209. The engine I/F 2207 serves to send/receive a control command, status, or the like to and from a printer engine. The network I/F 2208 serves to connect the MFP to a local area network (LAN) or the like. The external I/F 2209 serves to send/receive data to and from a host computer or the like. The external I/F 2209 can be, for example, a serial bus interface such as a universal serial bus (USB) or an IEEE 1394.

[Rendering Command Processing]

FIG. 1 illustrates a configuration of an image processing system. With reference to the figure, processing will be described in which a raster image is generated by interpreting rendering commands received from a host computer 120, and the raster image is then printed out on a paper. In this description, a bitmap image is used as an example of the raster image.

The image processing system includes an application 121 which operates on the host computer 120 and is used for creating a page layout document, a word processor document, a graphic document, or the like. The digital document created by the application 121 is sent to a printer driver 122 so that rendering commands based on the digital document are generated. The rendering commands generated in this exemplary embodiment are expressed using a printer description language called a page description language (PDL) for creating page image data. Rendering commands generally include rendering instructions for data representing texts, graphics, images, etc.

The generated rendering commands are transferred to an image processing apparatus 100 connected with the host computer via a network or the like. The image processing apparatus 100 includes a PDL analysis section 101, a rendered object generation section 102, a rasterization processing section 103, a data storage section 104, an attribute processing section 200, and an image processing section 106.

The rendering commands transferred from the host computer 120 are first input to the PDL analysis section 101. The PDL analysis section 101 performs analysis processing on the basis of the input rendering commands. Data analyzed by the PDL analysis section 101 is input to the rendered object generation section 102. On the basis of the analyzed data, the rendered object generation section 102 generates a rendered object processable by the rasterization processing section 103. The generated rendered object is input to the rasterization processing section 103 which performs rasterization processing so as to generate a bitmap image 107. The generated bitmap image 107 is stored in the data storage section 104.

The rasterization processing section 103 also generates attribute information 108 of the bitmap image 107 which has been generated in accordance with the rendering commands. The attribute information 108 indicates an image characteristic to which each pixel belongs. The generated attribute information 108 is stored in the data storage section 104.

The attribute information 108 is obtained by image classification based on image characteristics. For example, attribute information includes: a text attribute associated with character data or data having an image characteristic of character data; an image attribute associated with bitmap data or data having an image characteristic of bitmap data; and a graphic attribute associated with drawing data or data having an image characteristic of drawing data.

Subsequently, the bitmap image 107 and the attribute information 108 stored in the data storage section 104 are input to the attribute processing section 200. The attribute processing section 200 performs a recalculation of attribute information, which will be described in detail below.

The bitmap image 107 stored in the data storage section 104 is also input to the image processing section 106. The image processing section 106 performs image processing on the bitmap image 107 such as color conversion and pseudo-halftone processing and then converts the processed image into an image of an image format compatible with an image output device 110.

Now, a case is described in which the converted image format is image data associated with four color recording agents: cyan (C), magenta (M), yellow (Y), and black (K). When the bitmap image 107 generated by the rasterization processing section 103 is red (R)/green (G)/blue (B) color space image data, the image processing section 106 converts the RGB color space image data into CMYK color space image data using a lookup table or the like. The image processing section 106 also performs pseudo-halftone processing which permits stable halftone image production in the image output device 110 capable of outputting an image with, in general, a limited gradation number. Further, using a spatial filter, the image processing section 106 performs sharpness enhancement processing, smoothing processing, or the like on an edge portion of the image so as to produce a more desirable output image.

The various image processing operations carried out by the image processing section 106 described above are performed in accordance with the attribute information of each pixel generated by the attribute processing section 200 using a setting appropriate for the image characteristic of each attribute.

For example, the lookup table can be switched which is used when RGB color space image data is converted into CMYK color space image data. By switching the lookup table, a relatively large amount of UCR (under color removal) can be set for a text attribute, which enhances the reproducibility of a monochromatic black character portion. For an image attribute, color conversion processing is performed with a view to enhancing color and gradation reproducibilies. Moreover, for example, screening processing can be performed using various matrixes depending on each attribute. For a natural image which belongs to an image attribute, a screen with a low screen ruling is applied with a view to obtaining increased gradation reproducibility. On the other hand, for a character which belongs to a text attribute or a line which belongs to a graphic attribute, a screen with a high screen ruling is applied with a view to obtaining increased resolution.

Image data which has undergone these processing operations described above is converted into a predetermined image format and then output to the image output device 110. Thus, the rendering commands received from the host computer 120 as image data can be printed out on the paper.

Referring now to FIG. 2, a configuration of the attribute processing section 200 shown in FIG. 1 is illustrated. An image area separation processing unit 300 determines image characteristics of individual pixels contained in the bitmap image 107 stored in the data storage section 104. This determination processing will be described in more detail below. An output of the image area separation processing unit 300 and the attribute information 108 stored in the data storage section 104 are input to an attribute information recalculation unit 400. The attribute information recalculation unit 400 generates new attribute information on the basis of the output from the image area separation processing unit 300 and the attribute information 108. The generated new attribute information is input to the image processing section 106. Processing of the attribute information recalculation unit 400 will also be described in detail below.

[Image Area Separation Processing]

Figure 3:
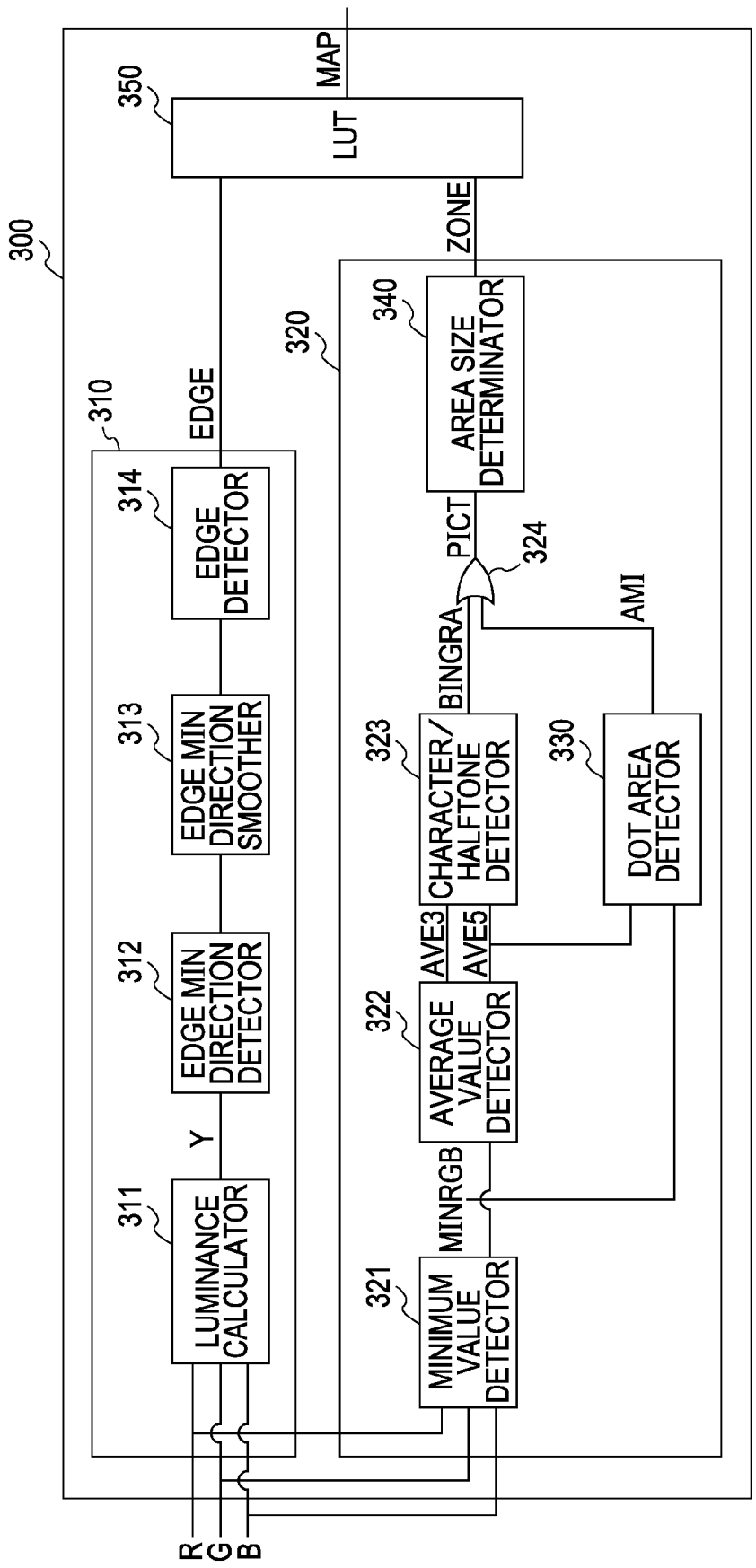
FIG. 3 illustrates a configuration of an image area separation processing unit according to an exemplary embodiment.

FIG. 3 illustrates a configuration of the image area separation processing unit 300 shown in FIG. 2. The image area separation processing unit 300 includes an edge detection circuit 310 for detecting an edge from a bitmap image and includes a thickness determination circuit 320 for discriminating a halftone area or a dot area from other areas. The image area separation processing unit 300 also includes a lookup table (LUT) 350 used for generating an output signal MAP.

<Operation of Edge Detection Circuit 310>

Figure 4A:
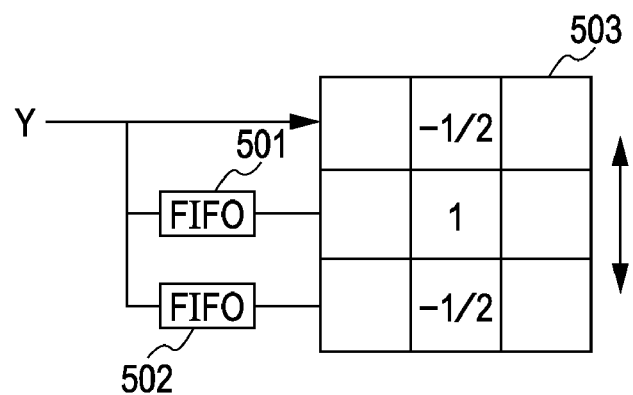
FIGS. 4A to 4D illustrate Laplacian filters used in an edge min direction detector according to an exemplary embodiment.
Figure 4C:
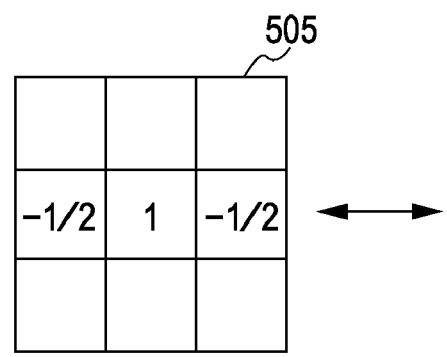
Figure 4B:
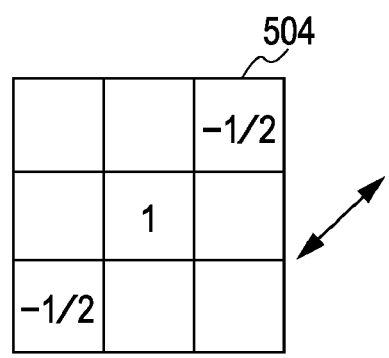
Figure 4D:
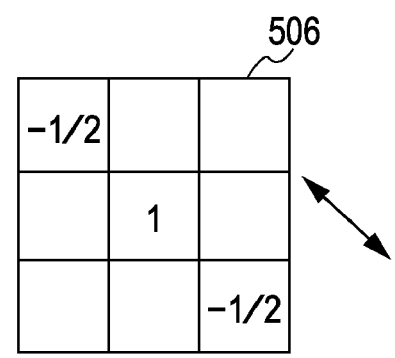

Using image signals R, G, and B input to the edge detection circuit 310, a luminance signal Y is calculated by a luminance calculator 311 as Y=0.25R+0.5G+0.25B. Then, in an edge MIN direction detector 312, the luminance signal Y is expanded to three lines delayed by one line by FIFOs 501 and 502 shown in FIG. 4A. These signals are filtered by so-called Laplacian filters 503 to 506 which correspond to vertical, upward diagonal, horizontal, and downward diagonal directions, respectively. Each of these filters produces a large output value, when an edge in the corresponding direction is emphasized. The absolute values of the outputs of these four filters which serve as the edge amounts are compared. Then the direction corresponding to the filter that outputs the minimum absolute value is determined as an edge MIN direction.

Then, an edge MIN direction smoother 313 performs smoothing processing on the edge MIN direction obtained by the edge MIN direction detector 312. With this smoothing processing, only a direction in which an edge is most emphasized can be maintained, and other directions can be smoothed. Thus, the feature of a dot pattern component which has large edge components in a plurality of directions decreases as the edge components are smoothed. On the other hand, the feature of a character/thin line component which has an edge component in only one direction can be maintained. Appropriately repeating this processing allows line and dot components to be separated more effectively, and also allows any character component present in a dot area to be detected. Then, an edge detector 314 removes signals having values equal to or smaller than the absolute value of a predetermined edge amount, and outputs signals as "1" which have values larger than the absolute value of the predetermined edge amount. The output signals of the edge detector 314 expressed using five codes, i.e., signals dilated by 7×7, 5×5, and 3×3 pixel block sizes, no dilation, and no edge, are output signals "EDGE" of the edge detection circuit 310. Note that signal dilation means ORing the signal values of all pixels in a block. Specifically, if a target pixel is "1", it indicates "no dilation (1×1)". In addition, when a signal is expanded by a 3×3 pixel block size and the result of an OR operation is "1", "3×3" is obtained. When a signal is dilated not by a 3×3 pixel block size, but by a 5×5 pixel block size and the result of an OR operation is "1", "5×5" is obtained. When a signal is expanded not by a 5×5 pixel block size but by a 7×7 pixel block size and the result of an OR operation is "1", "7×7" is obtained. If, for example, when a signal is dilated by a 7×7 pixel block size and the result of an OR operation is not "1", "no edge" is obtained. Thus, the signal EDGE is expressed by encoding the five values: "no dilation", "3×3", "5×5", "7×7", and "no edge". The "no edge" indicates "interior" which will be described below.

<Operation of Thickness Determination Circuit 320>

When image signals R, G, and B are input to the thickness determination circuit 320, a minimum value detector 321 calculates a MINRGB which is the minimum value of the image signals R, G, and B. Then, the MINRGB is input to an average value detector 322 to calculate an average value AVE5 of the MINRGB in 5 pixels×5 pixels around the target pixel, and an average value AVE3 of MINRGB in 3 pixels×3 pixels around the target pixel. The calculated AVE5 and AVE3 are input to a character/halftone detector 323. The character/halftone detector 323 detects the density of the target pixel and a change amount between the density of the target pixel and the average density of its surrounding pixels in units of pixels, thus determining if the target pixel constitutes a character or a halftone area. Then, a proper offset value OFST1 is added to AVE3, and the sum is compared with AVE5. If the sum is smaller than the AVE5, it is indicated that there is a density change around the target pixel, i.e., there is an edge portion of a character. In this case, an output signal BINGRA of the character/halftone detector 323 goes HIGH. Also, the sum of the OFST1 and the AVE3 is compared with a proper limit value LIM1. If the sum is smaller than the LIM1, it is indicated that the surrounding pixels have a density value that is higher than a predetermined value. Also in this case, the output signal BINGRA of the character/halftone detector 323 goes HIGH.

Figure 5:
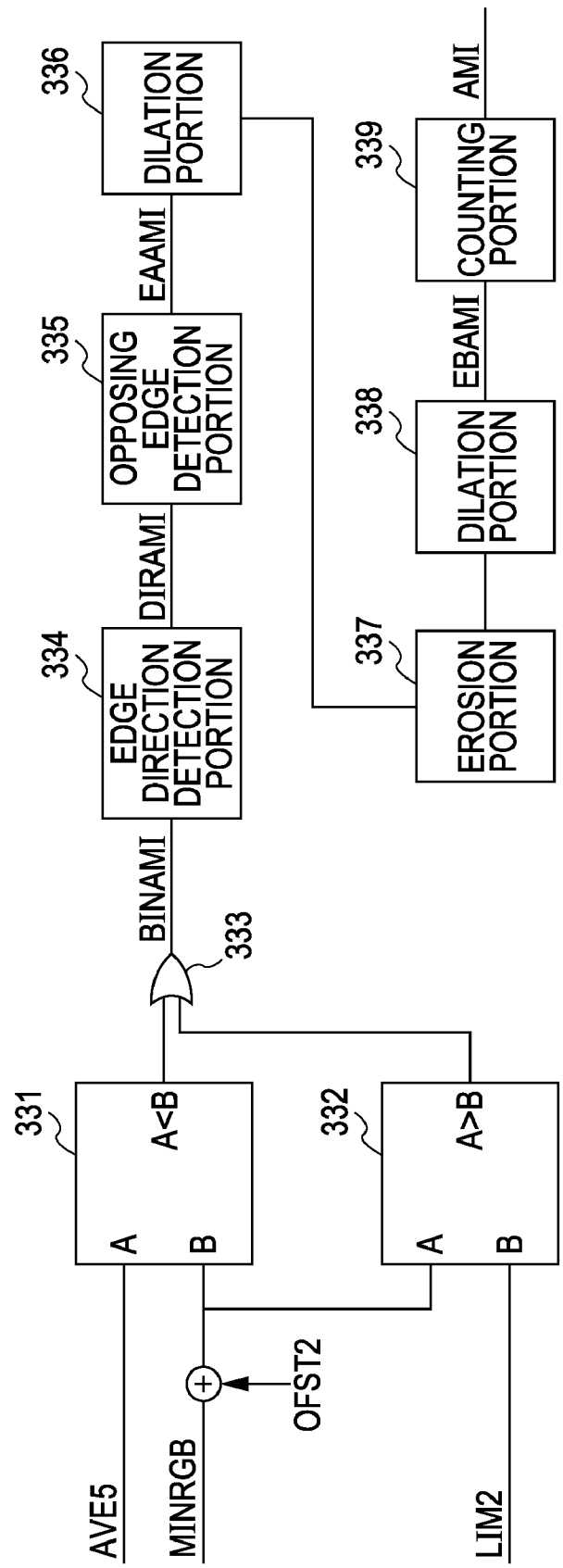
FIG. 5 illustrates a configuration of a dot area detector according to an exemplary embodiment.
Figure 8A:
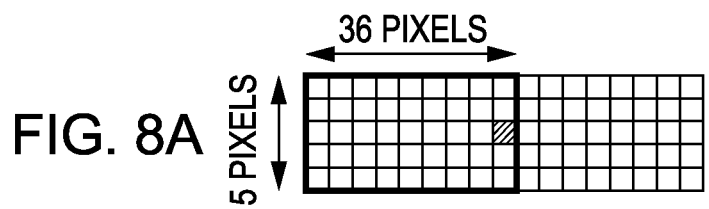
FIGS. 8A to 8I illustrate patterns of windows.
Figure 8B:
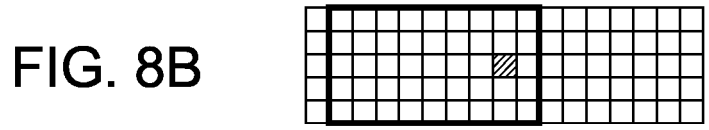
Figure 8C:
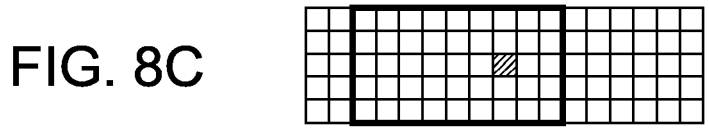
Figure 8D:
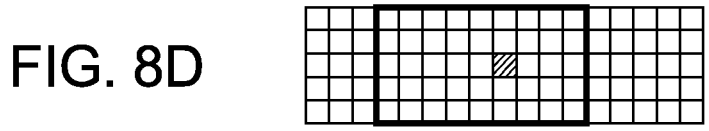
Figure 8E:
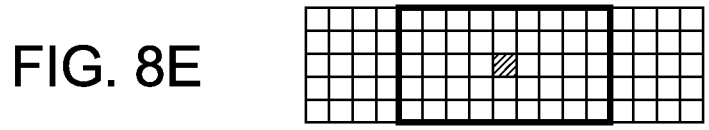
Figure 8F:
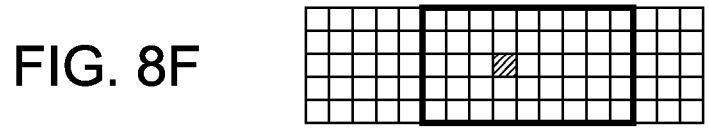
Figure 8G:
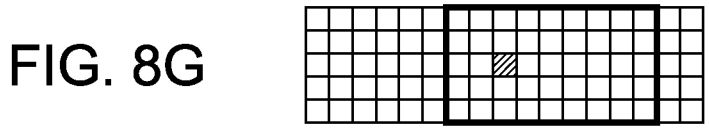
Figure 8H:
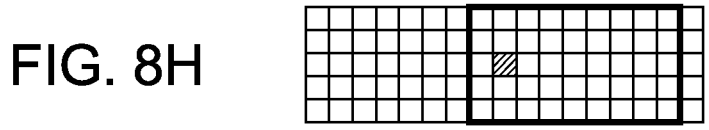
Figure 8I:
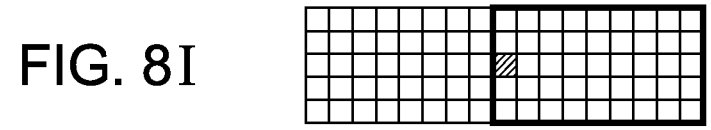

Detection of a dot area using a dot area detector 330 is herein described. Referring to FIG. 5, an exemplary configuration of the dot area detector 330 is illustrated. First, a proper offset value OFST2 is added to the MINRGB detected by the minimum value detector 321. The sum is compared with the AVE5 in a comparator 331. Also, the sum of the OFST2 and MINRGB is compared with a proper limit value LIM2 in a comparator 332. The output values of the two comparators are input to an OR gate 333. An output signal BINAMI of the OR gate 333 goes HIGH, when MINRGB+OFST2<AVE5, or MINRGB+OFST2<LIM2. Subsequently, using the signal BINAMI, an edge direction detection portion 334 detects edge directions of individual pixels. FIGS. 6A to 6D show the edge direction detection rules in the edge direction detection portion 334. When eight pixels around the target pixel satisfy any of conditions shown in FIGS. 6A to 6D, any of corresponding bits 0 to 3 of an edge direction signal DIRAMI is set HIGH.

Furthermore, an opposing edge detection portion 335 detects opposing edges in an area of 5 pixels×5 pixels that surround the target pixel. In a coordinate system as shown in FIG. 7 in which the signal DIRAMI of the target pixel is set as A33, the opposing edge detection rules are as follows:

(1) bit 0 of any of pixels A11, A21, A31, A41, A51, A22, A32, A42, and A33 is HIGH, and bit 1 of any of pixels A33, A24, A34, A44, A15, A25, A35, A45, and A55 is HIGH;

(2) bit 1 of any of pixels A11, A21, A31, A41, A51, A22, A32, A42, and A33 is HIGH, and bit 0 of any of pixels A33, A24, A34, A44, A15, A25, A35, A45, and A55 is HIGH;

(3) bit 2 of any of pixels A11, A12, A13, A14, A15, A22, A23, A24, and A33 is HIGH, and bit 3 of any of pixels A33, A42, A43, A44, A51, A52, A53, A54, and A55 is HIGH; and (4) bit 3 of any of pixels A11, A12, A13, A14, A15, A22, A23, A24, and A33 is HIGH, and bit 2 of any of pixels A33, A42, A43, A44, A51, A52, A53, A54, and A55 is HIGH.

When any of the above conditions (1) to (4) is satisfied, a signal EAAMI is set HIGH. That is, when opposing edges are detected by the opposing edge detection portion 335, the opposing edge signal EAAMI goes HIGH.

Subsequently, a dilation portion 336 performs dilation of 3 pixels×4 pixels on the signal EAAMI. If a pixel with HIGH EAAMI is included in the 3 pixels×4 pixels which surround a target pixel, the signal EAAMI of the target pixel is rewritten to HIGH. Further, using an erosion portion 337 and a dilation portion 338, an isolated detection result in an area of 5 pixels×5 pixels is removed so that an output signal EBAMI is obtained. In this processing, the erosion portion 337 outputs HIGH, only when all of the input signals are HIGH.

Then, a counting portion 339 counts the number of pixels whose output signals EBAMI from the dilation portion 338 are HIGH, within a window having an appropriate size. In this exemplary embodiment, an area of 5 pixels×68 pixels including a target pixel is used. Patterns of the window are illustrated in FIGS. 8A to 8I. In these figures, sample points in a window are nine points at 4-pixel intervals in the main scanning direction, and five lines in the sub-scanning direction, i.e., a total of 45 points. By moving this window in the main scanning direction with respect to the target pixel, nine windows can be prepared as shown in FIGS. 8A to 8I. That is, the area of 5 pixels×68 pixels having the target pixel as the center is referred to. In the individual windows, the number of HIGH signals EBAMI is counted, and when the number of HIGH signals EBAMI exceeds an appropriate threshold value, a dot area signal AMI is set HIGH.

Thus, the dot area signal AMI represents pixels included in an area where unisolated pixels between opposing edges are generally evenly present.

As described above, with the processing in the dot area detector 330, a dot image, which is detected as a set of isolated points by the above-mentioned signal BINGRA, can be detected as an area signal.

The character/halftone area signal BINGRA and dot area signal AMI detected by the foregoing processing are ORed by an OR gate 324 as shown in FIG. 3, so that a binary signal PICT of the input image is generated.

The signal PICT is then input to an area size determinator 340 for determining the area size of the binary signal.

Figure 9:
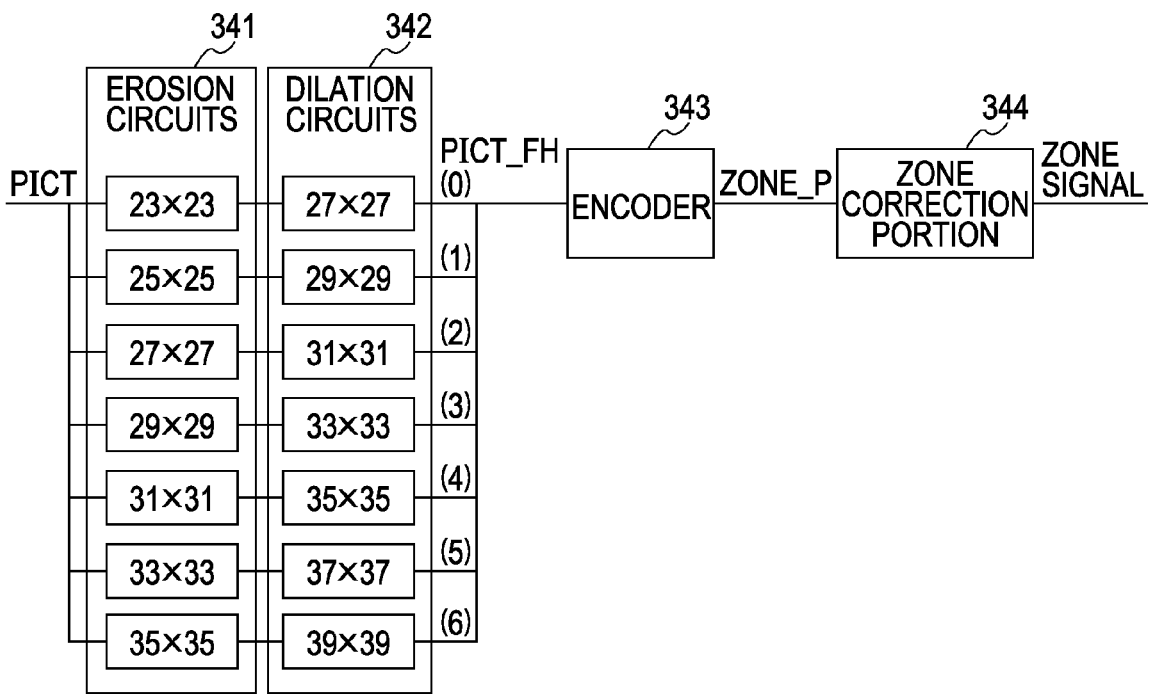
FIG. 9 is a block diagram illustrating an area size determinator according to an exemplary embodiment.

The area size determinator 340 is illustrated in FIG. 9. The area size determinator 340 includes a plurality of pairs of erosion circuits 341 and dilation circuits 342, which have different area sizes to refer to. The signal PICT is line-delayed in accordance with the area sizes of the erosion circuits 341, and is then input to the erosion circuits 341. In this exemplary embodiment, seven different erosion circuits are prepared in accordance with the area sizes to refer to the pixel range from 23 pixels×23 pixels to 35 pixels×35 pixels in step of 2 pixels×2 pixels. Signals output from the erosion circuits 341 are line-delayed and are then input to the dilation circuit 342. In this exemplary embodiment, seven different expansion circuits from 27 pixels×27 pixels to 39 pixels×39 pixels are prepared which correspond to the outputs from the erosion circuits as shown in FIG. 9, and the output signals PICT_FH from the individual expansion circuits are obtained.

Figure 10:
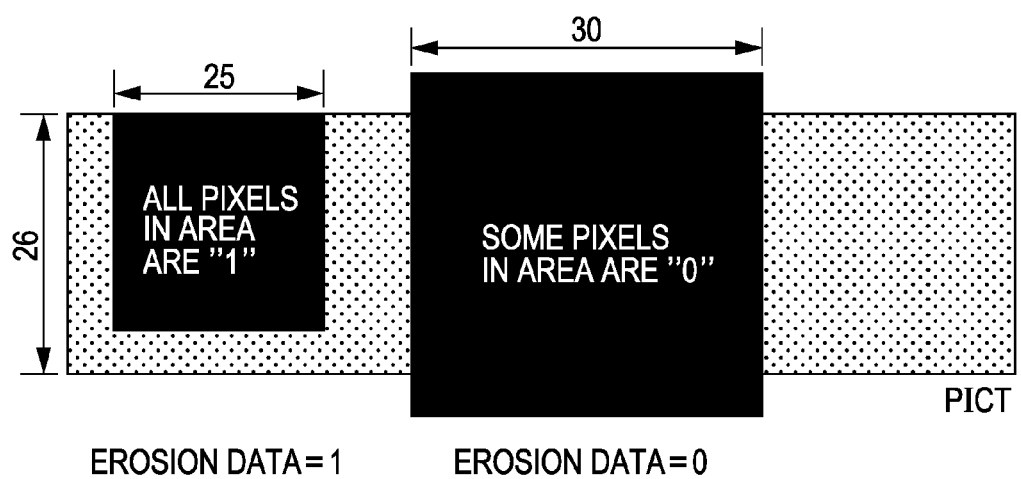
FIG. 10 illustrates a procedure for determining a character thickness.

When a target pixel is a portion of a character, the output signal PICT_FH is determined by the thickness of that character. FIG. 10 illustrates an exemplary process for determining the output signal PICT_FH using the thickness of the character. For example, when the signal PICT has a width of 26 pixels and is present in a stripe pattern, if it undergoes erosion with a size larger than 27 pixels×27 pixels, the output becomes all 0s; if the signal PICT undergoes erosion with a size smaller than 25 pixels×25 pixels, a signal having a width of 2 pixels in a stripe pattern remains at the center. This erosion is followed by dilation with the corresponding size. As a result, an output signal PICT_FH (1) in a stripe pattern having a width of 30 pixels is obtained. Output signals PICT_FH (0) to (6) are likewise obtained and input to an encoder 343 shown in FIG. 9, so that an image area signal ZONE_P to which the target pixel belongs is obtained.

Figures 11, 12:
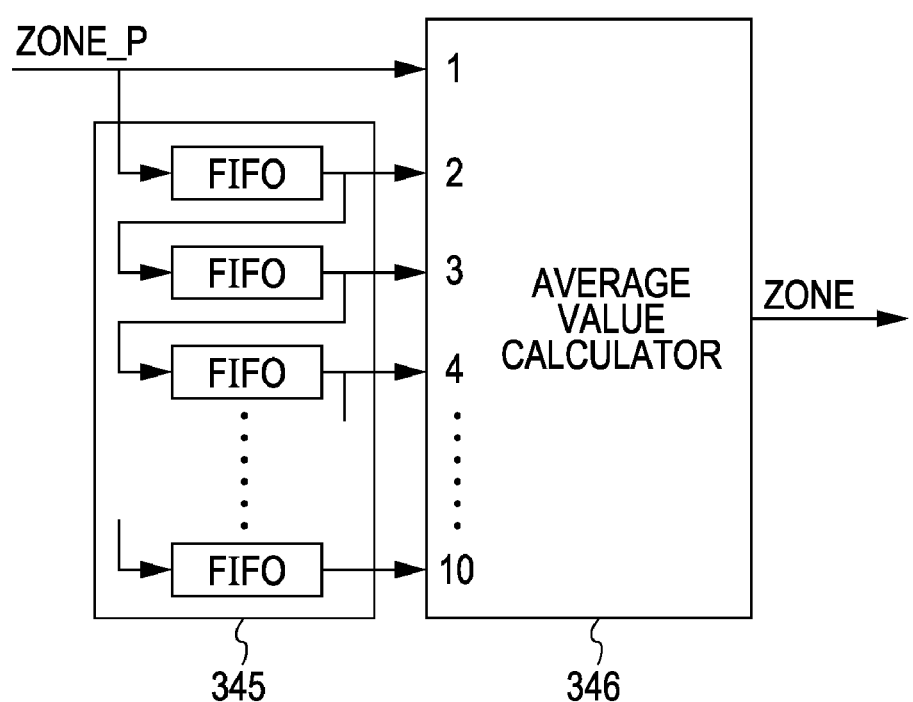
FIG. 11 illustrates an encode rule of an encoder according to an exemplary embodiment.
FIG. 12 is a block diagram illustrating a ZONE correction portion according to an exemplary embodiment.

FIG. 11 illustrates the encode rule of the encoder 343. With this processing, a picture image or dot image having HIGH signals PICT over a broad area is defined as area 7 (maximum value), and a character or line drawing image with an area size smaller (thinner) than the maximum value is defined as a multi valued image area corresponding to its size (thickness). In this exemplary embodiment, the signal ZONE_P consists of 3 bits to express the thickness of a character in eight levels. The thinnest character is indicated by "0", and the thickest character (including an area other than a character) is indicated by "7".

Referring to FIG. 12, a ZONE correction portion 344 shown in FIG. 9 is illustrated. An average value calculator 346 receives signals ZONE_P line-delayed by a plurality of FIFOs 345, and calculates an average value of 10 pixels×10 pixels. The signal ZONE_P produces a larger output value as the thickness of a character increases and produces a smaller output value as the thickness of the character decreases. Therefore, the output from the average value calculator 346 can directly serve as a corrected ZONE signal. The pixel block size used for correction can be determined in accordance with the pixel block size used for determining the thickness of the character. Using the corrected ZONE signal, the subsequent processing operations are performed. Consequently, even in a portion where abrupt changes in the thickness of a character/line are present, results of thickness determination smoothly change, which eliminates or reduces deterioration of image quality due to a change in black character processing.

The LUT 350 outputs an image separation result signal MAP which indicates an attribute of each pixel contained in an input bitmap image, in accordance with the output signal EDGE of the edge detection circuit 310 and the output signal ZONE of the thickness determination circuit 320. This operation of the LUT 350 is performed, for example, on the basis of a table shown in FIG. 13. In the example shown in FIG. 13, attributes indicated by the MAP are classified into character, character interior, and picture. However, other classifications can be applied.

<Attribute Information Recalculation Processing>

Figure 23:
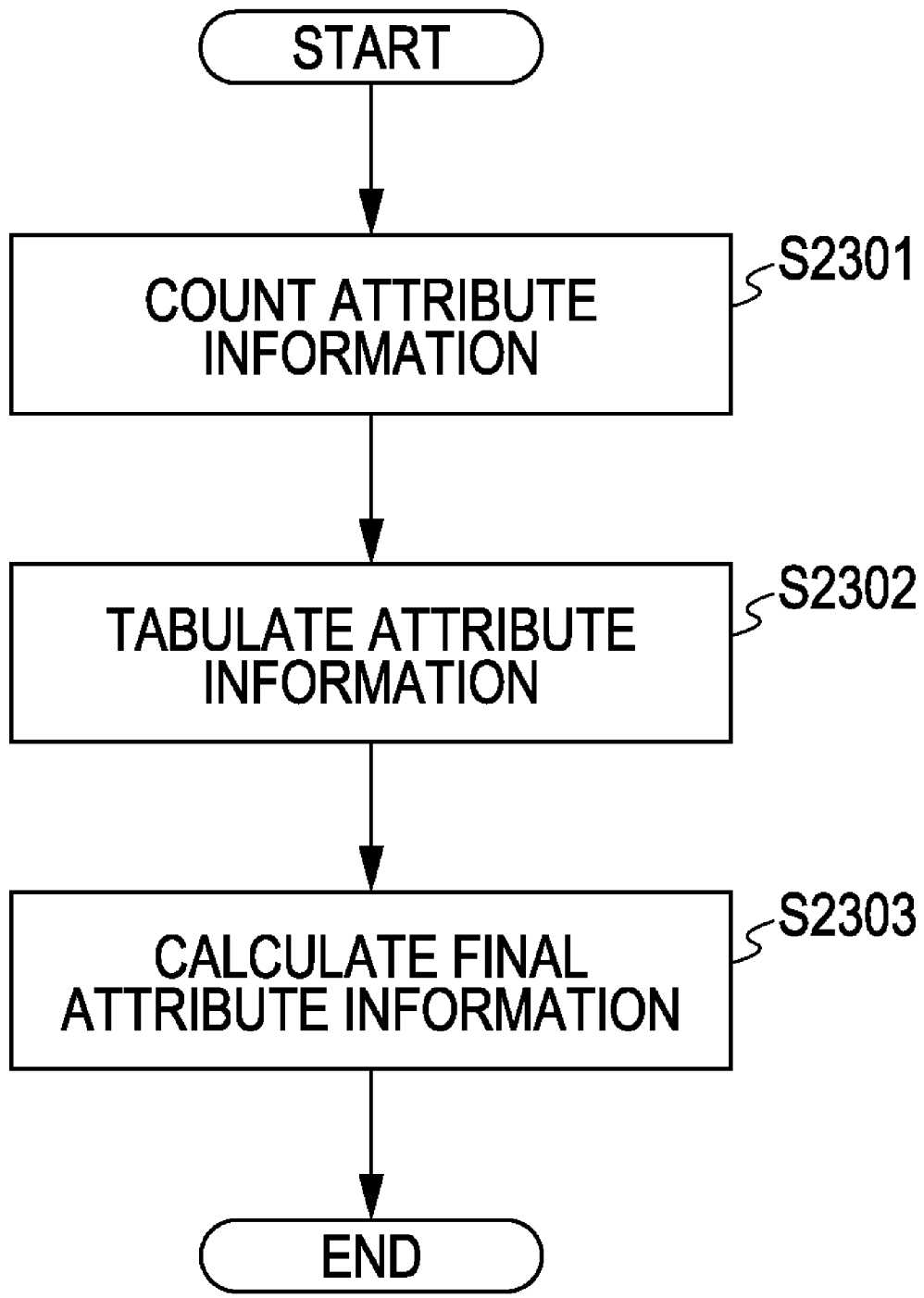
FIG. 23 is a flowchart illustrating an exemplary processing procedure for tabulating attribute information.

FIG. 14 and FIG. 15 show an example illustrating processing in which the attribute information recalculation unit 400 performs tabulation of attribute information on the basis of attribute information generated from PDL and an output value obtained from the image area separation processing unit 300. FIG. 23 is a flowchart illustrating a process procedure controlled by the CPU 2201, in which the attribute information recalculation unit 400 carries out the tabulation of attribute information. FIG. 14 shows examples of the PDL attribute information and the image area separation result within an identical object in an image. The attribute information recalculation unit 400 first looks up both the PDL attribute information and the image area separation result, and performs counting using twelve counters shown in FIG. 15, in accordance with combinations of the looked-up information, at Step S2301. FIG. 14 shows examples of the PDL attribute information and the image area separation result in a range of pixels. In this figure, in the case of the pixel at the upper right corner in the above-mentioned range, for example, the PDL attribute information is text, and the image area separation result is character. Thus, the counter cnt00 shown in FIG. 15 is incremented. In the case of the pixel at the lower right corner, the PDL attribute information is text, and the image area separation result is picture. Thus, the counter cnt02 is incremented. Similarly, attribute information with respect to each pixel is tabulated using the counters cnt00 to cnt32, at Step S2302. This processing can be performed on all pixels in an image or can be arranged to be performed by discretely selecting pixels in accordance with a predetermined sampling rate.

Referring to FIG. 16, contents upon which image processing is subsequently performed are categorized into A, B, and C. That is, the figure shows an example of a rule applied for allocating three types of final attribute information. On the basis of the shown rule, when final attribute information is obtained from counter values resulted from the tabulating operations described above, the following results are obtained, at Step S2303.

Final attribute information allocated to a pixel of a text PDL attribute:
    A, where MAX(cnt00, cnt01, cnt02)=cnt00
    A, where MAX(cnt00, cnt01, cnt02)=cnt01
    B, where MAX(cnt00, cnt01, cnt02)=cnt02

Final attribute information allocated to a pixel of a line PDL attribute:
    A, where MAX(cnt10, cnt11, cnt12)=cnt10
    B, where MAX(cnt10, cnt11, cnt12)=cnt11
    B, where MAX(cnt10, cnt11, cnt12)=cnt12

Final attribute information allocated to a pixel of a graphic PDL attribute:
    A, where MAX(cnt20, cnt21, cnt22)=cnt20
    B, where MAX(cnt20, cnt21, cnt22)=cnt21
    C, where MAX(cnt20, cnt21, cnt22)=cnt22

Final attribute information allocated to a pixel of an image PDL attribute:
    B, where MAX(cnt30, cnt31, cnt32)=cnt30
    C, where MAX(cnt30, cnt31, cnt32)=cnt31
    C, where MAX(cnt30, cnt31, cnt32)=cnt32

With the above processing, the final attribute information to be input to the image processing section 106 is determined.

In the example described above, the final attribute information is categorized into an attribute A, an attribute B, and an attribute C. Using these information categories, for example, the image processing section 106 carries out switching of image processing schemes described below.

In color conversion processing which converts RGB color space image data into CMYK color space image data, for data of the attribute A, an LUT is used in which a large amount of UCR is set for achieving high reproducibility of a monochromatic black character portion. For the attribute B a reduced amount of UCR is set with a view to enhancing reproducibility of a high density part. For the attribute C, a table arranged in view of high color reproducibility is applied, so that high-quality natural image reproduction can be achieved.

In spatial filtering processing, for the attribute A, a filter with a highest edge emphasis effect is used, which causes edges to be reproduced sharply. For the attribute C, a filter with a high smoothing effect is applied, which prevents a moiré phenomenon. For the attribute B, a filter having an intermediate characteristic between the above two filters is applied.

In pseudo-halftone processing, error diffusion processing is employed for the attribute A, which brings about high edge reproducibility. For the attribute B, screening processing with high screen ruling is applied in view of high resolution and gradation stability. On the other hand, for the attribute C, screening processing with low screen ruling which provides highest gradation stability is applied to achieve the reproduction of a natural image with smooth gradation.

Second Embodiment

There can be a case where PDL attribute information stored in the data storage section 104 varies depending on the type or version of the application 121. For example, there can be a case in which, with respect to an object that can be handled uniformly on a personal computer, an application determines the PDL attribute information of the object to be text, and other application determines it to be graphic. When this failure is found in advance, it is desirable to apply a final attribute information allocation rule most appropriate for the image processing section 106 and the image output device 110. Therefore, in the second exemplary embodiment, a plurality of rules is prepared for categorizing attribute information into A, B, and C, as described in the first embodiment. Then, when PDL data created by a predetermined application is received, final attribute information allocation rules are automatically switched in accordance with the application. This processing will be described below. FIGS. 17A to 17C illustrate an example in which three rules are prepared.

Figures 18, 19:
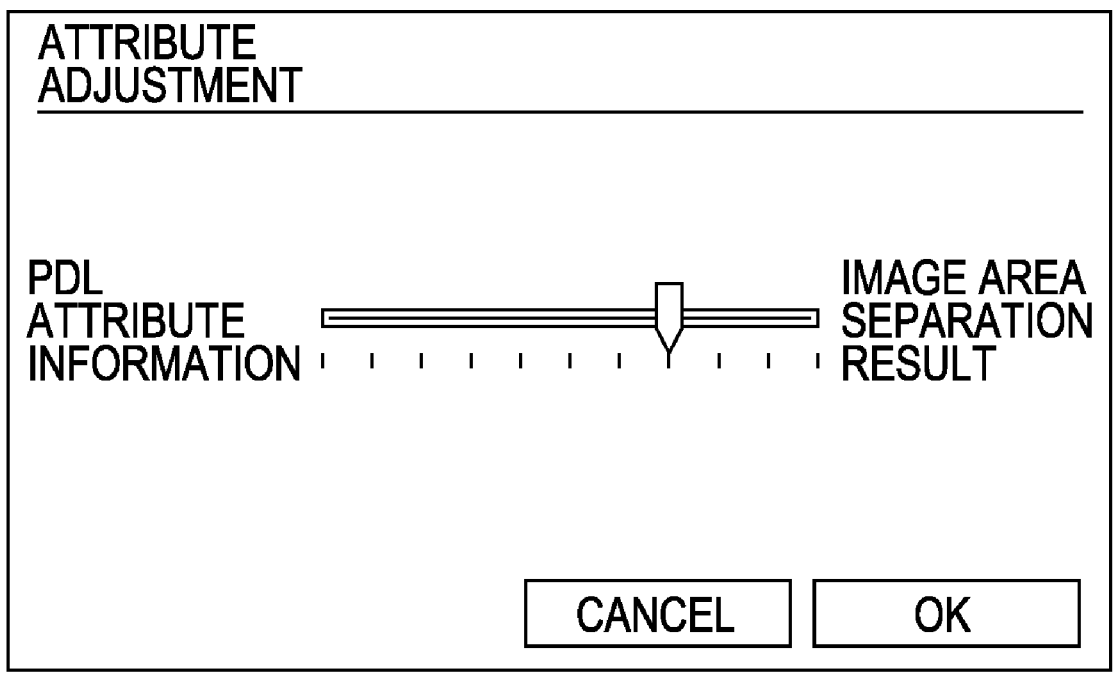
FIG. 18 illustrates rule tables to be used for final attribute information allocation.
FIG. 19 illustrates an example of an operation screen for adjusting an attribute for a third exemplary embodiment.

Upon receiving PDL data, the PDL analysis section 101 determines the type of the application 121 from which the PDL data is generated. The determination result is input to the attribute processing section 200 so as to be used for the switching of the final attribute information allocation rules when the attribute information recalculation processing is performed by the attribute information recalculation unit 400 as described in the first embodiment. FIG. 18 is a table used for the switching of the final attribute information allocation rules. For example, when the received PDL data is from an application A, a rule table shown in FIG. 17B (table 17B) is applied. When the received PDL data is from an application which is not registered, a rule table of FIG. 17A (table 17A) which is set as the default table is applied.

Thus, the final attribute information allocation rules are switched automatically in accordance with the application from which the received data is generated. This can eliminate or reduce the known failure associated with mismatching between PDL attribute information obtained from several applications.

Third Embodiment

In this third exemplary embodiment, an operation scheme will be described which is provided for assigning a weight to PDL attribute information and image area separation result through user operation.

FIG. 19 shows an example of an operation screen for prioritizing either PDL attribute information or image area separation result when attribute information recalculation processing is performed. A user assigns priority levels to the PDL attribute information and image area separation result.

Referring to FIGS. 20A to 20E, five rule tables to be applied for final attribute information allocation are shown. The rule table of FIG. 20A indicates a rule executed only when the PDL attribute information is used. This rule table is applied by placing an indicator shown in FIG. 19 at the leftmost position. Similarly, the rule table of FIG. 20E indicates a rule executed only when the image area separation result is used, and is applied by placing the indicator at the rightmost position. The rule tables of FIG. 20B to 20D are applied when the indicator is placed in intermediate positions. A higher weight is assigned to the image area separation result information when the rule table of FIG. 20D is applied, and a lower weight is assigned to the image area separation result information when the rule table of FIG. 20B is applied. An intermediate weight level is assigned to the image area separation result information when the rule table of FIG. 20C is applied.

In this exemplary embodiment, the case is described where the final attribute information is categorized into three types, similarly to the first and second embodiments. However, the number of categories is not limited to three. A number of categories can be used in the rule tables of FIG. 20A to 20E, and an image processing coefficient and an image processing scheme corresponding to each category can be set in detail. For example, an arrangement can be made in which, in spatial filtering processing, the gain of a filter used for the processing is set to 500% for data categorized as the attribute A according to the rule table of FIG. 20A, and that the filter gain is set to 400% for data categorized as the attribute A according to the rule table of FIG. 20B.

Fourth Embodiment

Figure 21:
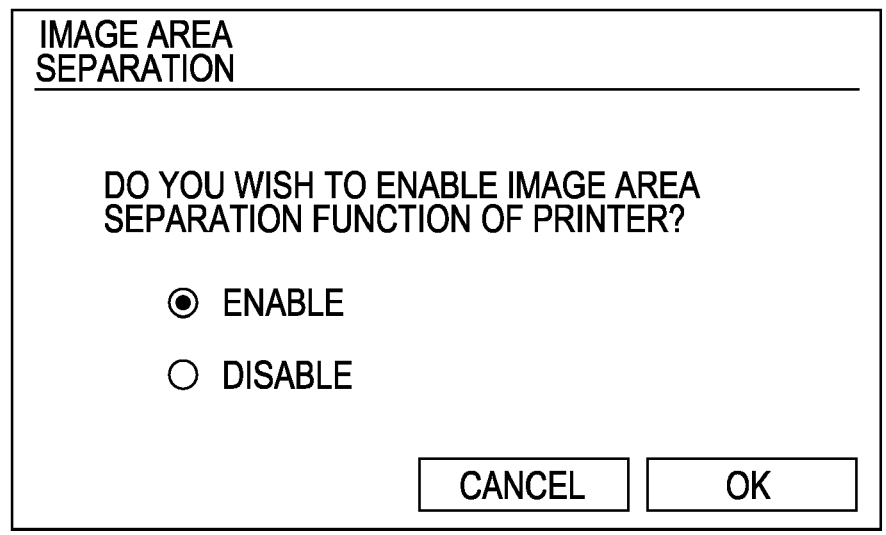
FIG. 21 illustrates an example of an operation screen for setting of image area separation processing for a fourth exemplary embodiment.

In this exemplary embodiment, an operation scheme will be described for enabling or disabling image area separation processing. This operation scheme is provided in view of a case in implementations of the above exemplary embodiments, where, for example, primary importance is placed not on the image quality but on the printing speed. FIG. 21 shows an example of an operation screen for designating an enable or disable status of image area separation processing. Using this screen, a user can select either "enable" or "disable". If the user desires to effect the processing described in the first to third embodiments, "enable" is to be selected. When the user selects "disable" the image area separation processing is skipped, and image processing is performed in accordance with only the PDL attribute information as is the case in the known art.

As described above, attribute information generated from a result of image area separation processing performed on a raster image data and attribute information generated from a PDL file are efficiently utilized. This brings about increased quality of an output image.

Other Embodiments

The scope of the present invention is not limited to an apparatus and method used for implementing the exemplary embodiments described above. For example, a software program for implementing the above exemplary embodiments can be supplied to a computer (CPU or micro-processing unit (MPU)) within the above-described apparatus or the like. Then, the computer can control the various components described above in accordance with the program, so that the embodiments can be implemented.

As a recording medium for storing such a program described above, for example, a floppy disk, a hard disk, an optical disk, an optical magnetic disk, a compact disk-ROM (CD-ROM), a magnetic tape, a nonvolatile memory card, a ROM, etc. can be used.

With the control executed by the computer on the various components in accordance with only the supplied program, the functions of the above exemplary embodiments can be implemented. In addition, the above exemplary embodiments can be implemented by cooperation of the program and an operating system being activated on the computer or other application software or the like.

Furthermore, this supplied program can be stored in a memory provided in a function extension board of the computer or in a function extension unit connected to the computer, and a CPU or the like provided in the board or the unit can execute all or part of processing in accordance with instructions from the program. This processing performed by the CPU can effect implementations of the above exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-191540 filed on Jun. 30, 2005, which is hereby incorporated by reference herein in its entirety.

What is claimed is:

1. An image processing apparatus comprising:
a first generating unit configured to generate first attribute information of an image and pixels of the image based on rendering commands;
a second generating unit configured to perform image area separation processing on the image and to generate second attribute information of the pixels of the image based on a result of the image area separation processing; and
an attribute information generating unit configured to generate third attribute information of the pixels of the image based on the generated first attribute information and the generated second attribute information,
wherein the attribute information generating unit is configured to generate the third attribute information of pixels contained in an object of the image represented by the first attribute information which is identical for each pixel in the object based on a combination of the first attribute information and the second attribute information.

2. The image processing apparatus of claim 1,
wherein the attribute information generating unit is configured to generate the third attribute information in accordance with a rule for allocating the third attribute information based on a combination of the first attribute information and the second attribute information.

3. The image processing apparatus of claim 1,
wherein the attribute information generating unit is configured to generate the third attribute information based on a most frequently found combination of the first attribute information and the second attribute information in the object of the image.

4. The image processing apparatus of claim 1,
wherein the attribute information generating unit is configured to generate the third attribute information which is identical for each pixel in the object.

5. The image processing apparatus of claim 2, further comprising:
an application information acquiring unit configured to acquire information on an application which generates the rendering commands;
a holding unit configured to hold a plurality of rules for allocating the third attribute information; and
a selecting unit configured to select a rule to be applied from the plurality of the rules based on the acquired application information.

6. The image processing apparatus of claim 2, further comprising:
a determining unit configured to determine a priority level for the first attribute information and the second attribute information;
a holding unit configured to hold a plurality of rules for allocating the third attribute information; and
a selecting unit configured to select a rule to be applied from the plurality of rules based on the determined priority level.

7. The image processing apparatus of claim 1, further comprising an image processing unit configured to perform image processing based on the third attribute information.

8. An image processing method comprising:
generating first attribute information of an image and pixels of the image based on rendering commands;
performing image area separation processing on the image;
generating second attribute information of the pixels of the image based on a result of the image area separation processing; and
generating third attribute information of the pixels of the image based on the generated first attribute information and the generated second attribute information,
wherein the third attribute information of pixels contained in an object of the image represented by the first attribute information which is identical for each pixel in the object is generated based on a combination of the first attribute information and the second attribute information.

9. The image processing method of claim 8,
wherein the third attribute information is generated in accordance with a rule for allocating the third attribute information based on a combination of the first attribute information and the second attribute information.

10. The image processing method of claim 8,
wherein the third attribute information is generated based on a most frequently found combination of the first attribute information and the second attribute information in the object of the image.

11. The image processing method of claim 8,
wherein third attribute information is identical for each pixel in the object.

12. The image processing method of claim 9, further comprising:
acquiring information on an application which generates the rendering commands;
holding a plurality of rules for allocating the third attribute information; and
selecting a rule to be applied from the plurality of rules based on the acquired application information.

13. The image processing method of claim 9, further comprising:
determining a priority level for the first attribute information and the second attribute information;
holding a plurality of rules for allocating the third attribute information; and
selecting a rule to be applied from the plurality of rules based on the determined priority level.

14. The image processing method of claim 8, further comprising performing image processing based on the third attribute information.

15. A recording medium for storing a program for controlling an image processing apparatus to implement the image processing method according to claim 8.

* * * * *